United States Patent [19]

Hammel et al.

[11] 4,044,268
[45] Aug. 23, 1977

[54] MULTIPLE POWER SOURCE AUTOMATIC SWITCHING CIRCUITRY

[75] Inventors: Ronald O. Hammel, Englewood; Charles E. Coleman, Lakewood, both of Colo.

[73] Assignee: The Gates Rubber Company, Denver, Colo.

[21] Appl. No.: 646,731

[22] Filed: Jan. 5, 1976

[51] Int. Cl.² .............................................. H02J 9/06
[52] U.S. Cl. .................................................... 307/66
[58] Field of Search ...................... 307/66, 64, 23, 130, 307/85, 86, 87, 43; 320/29, 30

[56] References Cited

U.S. PATENT DOCUMENTS

| 3,041,465 | 6/1962 | Ayre | 307/66 |
| 3,573,483 | 4/1971 | White | 307/66 |
| 3,631,257 | 12/1971 | Behr | 307/66 |
| 3,766,403 | 10/1973 | Tsutsumi | 307/66 |

Primary Examiner—Herman J. Hohauser
Attorney, Agent, or Firm—Curtis H. Castleman, Jr.; Raymond Fink; H. W. Oberg, Jr.

[57] ABSTRACT

Circuitry is provided for automatically selectively switching a load from a primary power source to a secondary power source, and back again, including switch means connected between the primary and secondary power sources, and control circuit means which controls opening and closing of the switch according to the sensed voltage level of the primary source. Once the secondary power source has been switched on, at such time as its voltage level drops below a predetermined level the switch can be adapted to automatically disconnect the secondary power source (e.g., battery) from the load.

10 Claims, 3 Drawing Figures

MULTIPLE POWER SOURCE AUTOMATIC SWITCHING CIRCUITRY

BACKGROUND OF THE INVENTION

This invention relates to circuitry for automatically and selectively switching a load from one power source, which has failed, to another power source, and automatically reconnecting the load to the first power source when it has regained a predetermined threshold voltage level.

Electrical systems are known in which a battery automatically operates electrical apparatus upon failure of a primary power source normally operating other electrical apparatus, as for instance in a system in which the storage battery automatically operates an auxiliary lighting system when the power serving the main lighting system fails. Examples of such systems are taught in U.S. Pat. Nos. 3,114,095 to Palmer and 3,223,913 to Kalns et al.

Other systems employ a single load normally connected to a primary power source which, upon failure, can be connected to a secondary power source of matched voltage such as a battery which has been maintained in a charged condition. However, these systems do not provide for automatically disconnecting the load from the secondary power source when that source drops in voltage below a predetermined cut-off level. For instance, certain battery systems may suffer irreparable damage if they are discharged below a certain voltage corresponding to a given percentage of capacity, e.g., when 50 to 95% of the available capacity of the battery has been discharged.

It is a primary object of this invention to provide circuitry for atuomatically and selectively switching a load from a primary source to a secondary power source, and also preferably providing for automatically disconnecting the load from the secondary power source when that source has dropped to a predetermined cut-off voltage level as sensed by the circuitry.

SUMMARY OF THE INVENTION

Briefly described, the invention embodies circuitry connectable between primary and secondary power sources for supplying a load with power, including (1) normally open switch means connected between the primary and secondary power sources and which, upon failure of the primary source automatically closes to connect the secondary power source across the load, and (2) control circuit means, responsive to the voltage level or proportion of the voltage level exhibited by the primary source, for automatically closing the switch means when the voltage of the primary source drops below a predetermined threshold level indicating failure. The control circuit means also provides for automatically reopening the switch means when the voltage of the primary source exceeds the threshold level thereby reconnecting the load to the primary power source.

The circuitry preferably includes a provision for sensing and responding to the voltage of the secondary power source, so that at such time as it drops below a predetermined cut-off voltage level the switch means opens, automatically disconnecting the secondary power source from the load.

BRIEF DESCRIPTION OF THE DRAWINGS

The invention will be more particularly described in its preferred embodiments with reference to the accompanying drawings, in which like numerals designate like parts, and in which.

PREFERRED EMBODIMENTS OF THE INVENTION

It will be appreciated that there are various applications for the circuits shown in the Figures, among which would be circuitry for supplying power to an exit light (the load), which would be kept illuminated by a battery (secondary power source) if the AC power failed. Other examples include use in semi-conductor memory protection systems and intrusion alarm systems, and it will be appreciated that the invention applies to the provision of power from multiple power sources of preferably substantially matched voltages to various types of loads.

Figure 1:
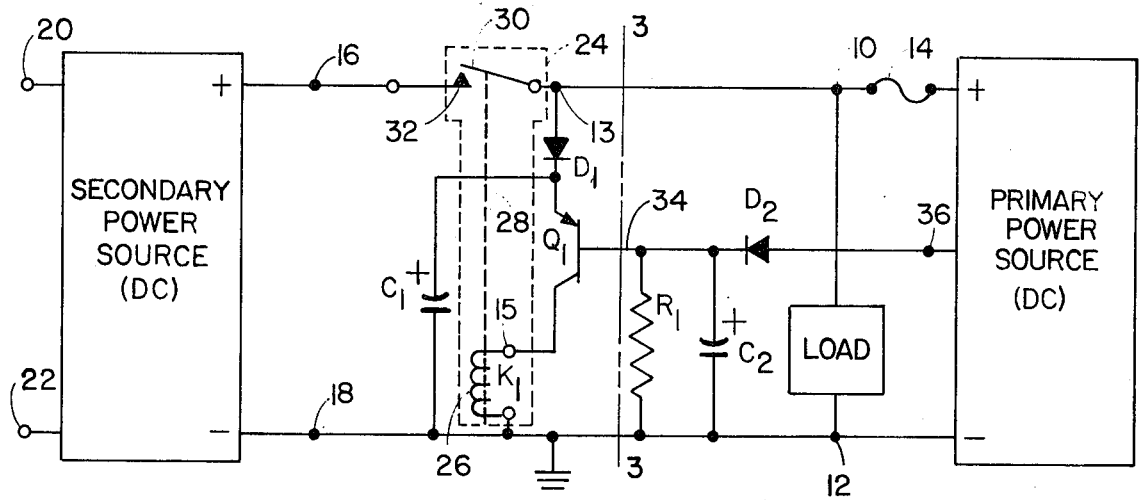
FIG. 1 is a circuit diagram of the invention as applied to a DC primary power source and a DC secondary power source.

In the embodiment of FIG. 1, the output terminals 10 and 12 of the primary power source are normally connected across the load. Fuse 14 may be provided in the line to protect against line transient voltages. The primary power source in this embodiment is DC, and may be any suitable source such as a battery, or AC to DC converter, such as a full bridge rectified 115 volt AC line, etc. The grounded side of the load is connected to one side of the secondary power source, which is also in this embodiment DC and exhibits a load voltage substantially in the same range as the output voltage of the primary power source when in its operating mode. The secondary power source is provided with output terminals 16, 18 and optionally input terminals 20, 22. In the event the secondary power source is a rechargeable battery, it may be recharged via such input terminals in known manner. Power for recharging may be derived from the primary power source (when in its operating mode) or any other suitable source, as desired.

The circuitry for automatically and selectively switching the load from the primary power source to the secondary power source (and vice-versa) includes switch means 24 and control circuitry for opening and closing the switch to be described hereafter. The switch means is preferably electromechanical and may be the relay $K_1$ shown. Any type of suitable relay may be employed, such as the form A single pole, single throw type illustrated in FIG. 1, including a magnet coil 26, a spring-biased armature link 28, contact arm 30 shown in the normally opened position, and contact 32.

The opening and closing of switch 24 is determined by whether shunting transistor $Q_1$ of the control circuitry, whose collector is connected to non-grounded side 15 of the relay, is in its substantially conducting (e.g., in saturation) or substantially nonconducting state. In turn, the conduction mode of transistor $Q_1$ is determined largely by the signal present at base 34 of the transistor, which is connected through diode $D_2$ to the primary power source at tapping point 36. The voltage sensed or picked off at tapping point 36 is related (preferably directly proportional and may be greater than 100%) to the voltage level exhibited by the primary power source.

The response time of the switching function is determined by capacitor $C_1$, connected from ground to the juncture of the emitter of transistor $Q_1$ and cathode of diode $D_1$, and the parallel combination of resistor $R_1$ and capacitor $C_2$ connected from point 34 to ground. If the primary source is pure DC (without ripple) $C_2$ can be omitted. In general, the control circuitry includes that portion of the circuitry which responds to the voltage at the tapping point 36 to cause the switch means to open or close according to the voltage level exhibited by the primary power source. In FIG. 1, in addition to $R_1$ and $C_2$, the control circuitry includes $D_1$, $D_2$, $C_1$ and $Q_1$.

Figure 3:
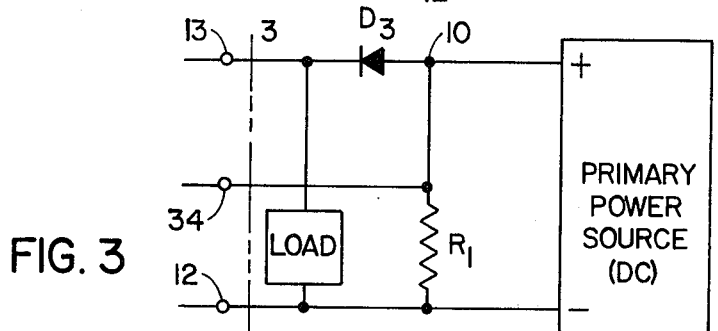
FIG. 3 is a modification of FIG. 1, showing alternative circuitry to the right of line 3—3.

In operation, under normal conditions the primary power source is supplying power to the load with capacitor $C_1$ charging through diode $D_1$. The presence of a positive voltage at base point 34 biases transistor $Q_1$ off so that relay $K_1$ is non-energized and contact arm 30 remains open, as shown. The voltage at the base 34 of $Q_1$ must be isolated from the secondary power source by diodes or other means (which may be included in the primary power source as in FIG. 1) such that transistor $Q_1$ can only be biased off by the primary power source and not by the secondary power source. During normal operation, the voltage applied at point 34 must be sufficiently high in magnitude to keep transistor $Q_1$ in its substantially nonconducting state. An example of such diode isolation using a DC primary power source (without ripple) is shown in the embodiment of FIG. 3. The secondary power source is isolated from base 34 by diode $D_3$. It will also be noted that $C_2$ and $D_2$ have been omitted, and the voltage level sensed by the control circuitry is the full output voltage of the primary power source.

When the primary power source fails, meaning either that its signal is completely removed or drops below a predetermined threshold level, the positive biasing voltage to the base 34 of transistor $Q_1$ is removed, so that resistor $R_1$ biases the base of transistor $Q_1$ to ground, thereby placing the transistor $Q_1$ in its conducting mode. Capacitor $C_1$ is then discharged through $Q_1$ into the coil of relay $K_1$, energizing it, and thereby closing relay contacts 30, 32 whereby power is reapplied to the load from the secondary power source.

Capacitor $C_1$ should be sized such that it stores sufficient energy to energize coil 26 and pull in the contacts 30, 32 of relay $K_1$ when the primary power fails. When the relay contacts 30, 32 of relay $K_1$ close, secondary power is supplied to the coil 26 of the relay, thereby continuing to keep the coil energized and supplying secondray power to the load. If the primary power source comes on again and attains a voltage above the predetermined threshold level, while the secondary power source is supplying power to the load, then the positive bias at base 34 will be sufficient to place transistor $Q_1$ in its substantially nonconducting mode which again opens the contacts 30, 32 of the relay as its coil 26 becomes de-energized.

When the secondary DC power source is a battery of the rechargeable type, it is oftentimes critical to remove the load from the battery when the battery has become substantially discharged. For instance, it may be desirable to disconnect the battery (and open switch 24) when the battery has reached its 90% discharge level, which is evidenced by a defined drop in its output voltage. A severely deep discharge below this level may do irreparable harm to the battery, as is known. The automatic disconnect feature of the invention is thus accomplished when the voltage of the secondary source has dropped below this predetermined cut-off level corresponding to a desired discharge level, thereby de-energizing the coil 26 of the relay $K_1$ sufficiently to reopen contacts 30, 32, and removing secondary power from the load. With the particular circuitry shown, power will not be reapplied to the load until the primary source is again enabled with an output voltage above the predetermined threshold level. The battery can then be recharged and the switching circuit readied for a new cycle.

The voltage level at which the secondary power source is to be disconnected can be selected, and latch out will be effected by a proper choice of relay $K_1$ and the voltage drop between points 13 and 15 across the diode and emitter-collector path of the transistor. Clearly, this voltage drop can be varied at will also by inclusion of additional diodes, zeners or dropping resistors or other circuitry to effect the desired latching out voltage across terminals 16, 18 (and hence the voltage applied to coil 26 will be determined).

If it is desired to maintain continuity in the power to the load even after the secondary power source has been automatically disconnected, and the primary power source has not regained full voltage, then the switch means 24 may also be utilized, in known manner, to energize a diesel start circuit or the like, whose output may be connected to points 10 and 12, across the load. Certainly other types of tertiary power backup systems could be employed, or additional power sources used, as needed.

Figure 2:
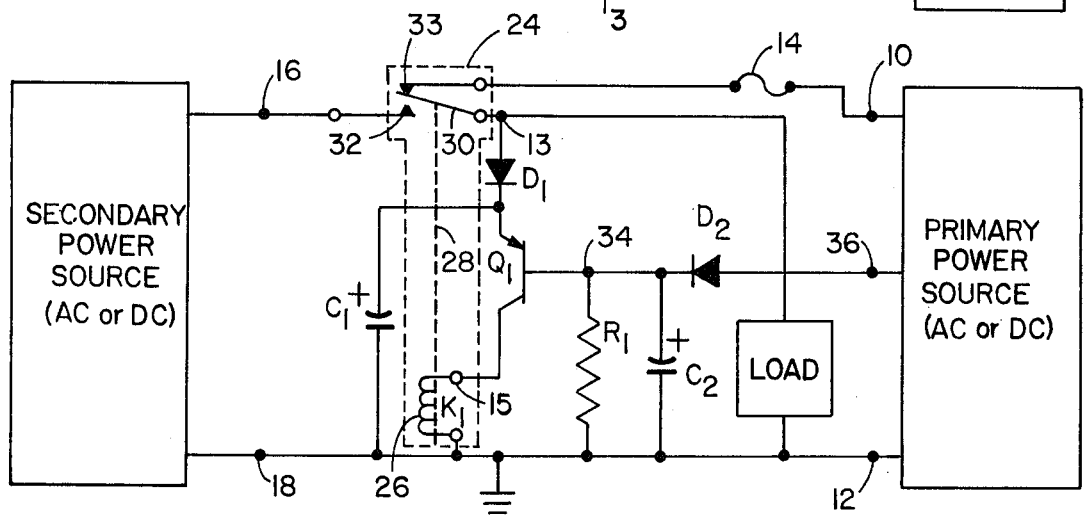
FIG. 2 is a similar circuit diagram to FIG. 1 however applying to the case where either the primary power source or secondary power source may be AC or DC, respectively.

The embodiment shown in FIG. 2 is virtually the same in structure and operation as that in FIG. 1 with the exception that a different contact relay is employed so that the primary power source is not always connected to the load, and the switching time is somewhat slower. A form C contact relay is utilized of the single pole, double throw type. This circuitry may employ either AC or DC primary or secondary power sources, so that any combination of AC or DC sources may be used in this system. Under normal operation, with the primary source supplying power to the load, the coil 26 of relay $K_1$ is de-energized and contact arm 30 makes contact with contact 33. As in the circuitry of FIG. 1, when the potential at point 34 has dropped sufficiently so that transistor $Q_1$ is biased on, relay coil 26 is energized thereby throwing the switch so that contact arm 30 makes contact with contact 32 thereby enabling the secondary power source.

The following component values for the circuitry of FIG. 1 have been found suitable in practice, when using as a secondary power source a 6 volt (nominal) sealed rechargeable lead-acid battery of the type described in U.S. Pat. No. 3,862,861. The primary power source is a step-down transformer connected to 115 v. AC line utilizing full wave rectification and a secondary winding center-tapped to supply, for instance, 6.3 v. DC to the load, and through a tertiary winding 12 v. DC to tap 36.

$Q_1$ — 2N5227
$K_1$ — Relay — Electronic Applications Co. No. 1A-6AHH Form A
$C_1$ — 33 mfd. 15WVDC
$C_2$ — 0.68 mfd. 20WVDC R₁ —33,000 ohms
D₁, D₂ - 1N4001
Load - No. 44 light bulbs in parallel The cut-off voltage for the battery was 2 volts, corresponding to about the 90% discharge level.

It will be appreciated that the invention is capable of a variety of modifications and variations which will become apparent to those skilled in the art upon a reading of this specification, and which are intended to be encompassed within the spirit and scope of the appended claims.

What is claimed is:

1. Automatic switching and disconnect circuitry for connecting a load normally across a primary power source, for connecting the load across a secondary power source when the primary power has failed, for disconnecting the secondary power source when its voltage has been reduced below a predetermined cut-off point corresponding to no greater than about its 90 percent discharge level, and to reenable the primary power source when it has regained power comprising:
   voltage responsive electromechanical switch means interposed between the primary and secondary power sources and operable between open and closed positions;
   first circuit means connected between the switch means and a tapping point at the primary power source for controlling the opening and closing of the switch means responsive to the voltage level of the primary power source;
   second circuit means connected between the secondary power source and the switch means for controlling the opening of the switch means, when the primary power source has failed, responsive to the voltage level of the secondary power source so that the secondary power source is automatically disconnected from the laod and any other discharge path in the circuitry with total latch out upon reduction of the voltage exhibited by the secondary power source to the cut-off point.

2. The circuitry of claim 1 wherein the voltage level at the tapping point of the first circuit means is isolated from the secondary power source.

3. The circuitry for automatically selectively switching a load from a primary power source to a secondary power source, comprising:
   electromechanical switch means providing positive on-off switch latching control connected between the primary and secondary power source which is normally open and which, upon failure of the primary source, automatically closes to connect the secondary power source across the load;
   control circuit means connected between the primary power source and switch means, responsive to the voltage level or a proportion of the voltage level exhibited by the primary power source, for automatically closing the switch means when the voltage of the primary power source drops below a predetermined threshold level indicating failure, and for automatically reopening the switch means when the voltage of the primary source exceeds the threshold level thereby reconnecting the load to the primary power source;
   said control circuit means being connected to the primary power source by way of a tapping point which reflects a voltage proportional to the voltage exhibited by the primary power source, the tapping point voltage being isolated from the secondary power source so that the control circuit means is free from control by the voltage state of the secondary power source;
   said control circuit means including a shunt transistor means whose emitter/collector path is connected to the switch means, and whose base is connected to the tapping point, opening and closing of the switch means being controlled by the state of conduction of the transistor means; and
   said switch means and said control circuit means being voltage responsive and so selected that when the voltage level of the secondary power source drops below a predetermined cut-off the switch means opens, automatically disconnecting the secondary power source from the load and any other discharge path in the circuitry.

4. Automatic switching and disconnect circuitry for connecting a load normally across a primary power source, for connecting the load across a secondary power source when the primary source has failed, for disconnecting the secondary power source when its voltage has been reduced below a predetermined cut-off point, and to reenable the primary power source when it has regained power, comprising:
   voltage responsive electromechanical switch means interposed between the primary and secondary power sources and operable between open and closed positions;
   first circuit means connected between the switch means and a tapping point at the primary power source for controlling the opening and closing of the switch means responsive to the voltage level of the primary power source;
   second circuit means connected between the secondary power source and the switch means for controlling the opening of the switch means, when the primary power source has failed, responsive to the voltage level of the secondary power source so that the secondary power source is automatically disconnected from the load and any other discharge path in the circuitry with total latch out upon reduction of the voltage exhibited by the secondary power source to the cut-off point; and
   said switch means having an energizable coil and the first circuit means including a shunt transistor characterized by substantially non-conducting and substantially conducting states and whose base is connected to the tapping point at the primary power source and whose emitter/collector path is connected to the coil of the switch means, and capacitor means dischargeable through the transistor and coil of the switch means in response to failure of the primary power source.

5. The circuitry of claim 4 wherein the second circuit means includes the transistor and voltage reference means connected between the transistor and a terminal of the secondary power source.

6. Circuitry for switching a load between operative connection across a primary power source having operative and failure conditions and a secondary battery power source, comprising:
   voltage responsive switch means including an energizable coil and contacts connected between the primary and secondary power sources normally open when the primary power source is in its operative condition;
   shunt circuit means including a transistor whose collector is connected to the coil of the switch means and whose emitter is connected to one side of the switch contacts;

circuit means connected from a tapping point at the primary power source to the base of the transistor for applying a bias to the base proportional to the voltage exhibited by the primary power source; and capacitor means connected in parallel across the emitter/collector path and coil of the switch means for energizing the coil when the transistor is placed in a conducting state.

7. The circuitry of claim 6 wherein the shunt circuit means further includes voltage reference means connected between the emitter of the transistor and one side of the switch contacts.

8. The circuitry of claim 7 wherein unidirectional diode means is connected between the tapping point and base of the transistor.

9. The circuitry of claim 8 wherein resistor and second capacitor means are connected across the base/collector junction and coil of the switch means.

10. The circuitry of claim 6 wherein the voltage present at the base of the transistor is isolated from the secondary power source by diode blocking means.

* * * * *